US010706429B2

(12) United States Patent
Raghunandan

(10) Patent No.: US 10,706,429 B2
(45) Date of Patent: Jul. 7, 2020

(54) IDENTIFICATION OF USERS FOR ADVERTISING PURPOSES

(75) Inventor: Hulikunta Prahlad Raghunandan, Maharashtra (IN)

(73) Assignee: International Business Machines Corporation, Armonk, NY (US)

(*) Notice: Subject to any disclaimer, the term of this patent is extended or adjusted under 35 U.S.C. 154(b) by 1961 days.

(21) Appl. No.: 11/755,905

(22) Filed: May 31, 2007

(65) Prior Publication Data

US 2008/0300976 A1    Dec. 4, 2008

(51) Int. Cl.
  *G06Q 30/00*   (2012.01)
  *G06Q 30/02*   (2012.01)
(52) U.S. Cl.
  CPC ......... *G06Q 30/02* (2013.01); *G06Q 30/0245* (2013.01); *G06Q 30/0251* (2013.01); *G06Q 30/0269* (2013.01); *G06Q 30/0277* (2013.01)
(58) Field of Classification Search
  USPC ........................................................ 705/14.1
  See application file for complete search history.

(56) References Cited

U.S. PATENT DOCUMENTS

| 5,991,735 | A | 11/1999 | Gerace |  |
| 6,012,051 | A * | 1/2000 | Sammon et al. | 706/52 |
| 6,430,558 | B1 | 8/2002 | Delano |  |
| 6,460,036 | B1 * | 10/2002 | Herz | 707/748 |
| 6,480,885 | B1 * | 11/2002 | Olivier | 709/207 |
| 6,508,706 | B2 | 1/2003 | Sitrick et al. |  |
| 6,839,680 | B1 | 1/2005 | Liu et al. |  |
| 7,016,307 | B2 | 3/2006 | Vasudev et al. |  |
| 7,039,639 | B2 | 5/2006 | Brezin et al. |  |
| 7,065,550 | B2 | 6/2006 | Raghunandan |  |

(Continued)

FOREIGN PATENT DOCUMENTS

EP    1675060 A1    6/2006

OTHER PUBLICATIONS

Sheng Tun Li, Enabling customer relationship management in ISP services through mining usage patterns, May 2006 https://www.sciencedirect.com/science/article/pii/S0957417405001508?via%3Dihub I (Year: 2006).*

(Continued)

*Primary Examiner* — Chrystina E Zelaskiewicz
*Assistant Examiner* — Alfred H Tsui
(74) *Attorney, Agent, or Firm* — Schmeiser, Olsen & Watts, LLP; Mark Vallone

(57) ABSTRACT

A method and system for identifying users for advertising. Users and attributes are identified. First web sites provided by ISPs accessed by the users are identified. First data received from the ISPs include content of the first web sites and user time spent thereon. The first data is analyzed to determine first attribute values indicative of interest in each attribute by each user. Second data received from ISPs include content of second web sites and user time spent thereon. Second attribute values are derived from questionnaires completed by the users, which indicate interest in each attribute by each user. Third attribute values are determined by combining the first attribute values with the second attribute values for each user. The third attribute values are processed to identify users to which a product or service may be advertised. The identified users are communicated to a provider of the product or service.

15 Claims, 15 Drawing Sheets

(56) References Cited

U.S. PATENT DOCUMENTS

| | | | |
|---|---|---|---|
| 7,069,308 B2 | | 6/2006 | Abrams |
| 7,072,847 B2 | | 7/2006 | Ulenas et al. |
| 7,660,737 B1 | * | 2/2010 | Lim et al. .................. 705/14.49 |
| 2001/0011226 A1 | * | 8/2001 | Greer et al. .................... 705/14 |
| 2002/0111994 A1 | * | 8/2002 | Raghunandan ............... 709/203 |
| 2005/0159970 A1 | | 7/2005 | Buyukkokten et al. |
| 2005/0203929 A1 | | 9/2005 | Hazarika et al. |
| 2006/0025972 A1 | | 2/2006 | Johnson et al. |
| 2006/0271441 A1 | * | 11/2006 | Mueller et al. .................. 705/14 |
| 2007/0006139 A1 | | 1/2007 | Rubin et al. |
| 2007/0028266 A1 | * | 2/2007 | Trajkovic et al. .............. 725/46 |
| 2008/0275916 A1 | * | 11/2008 | Bohannon ..................... 707/200 |
| 2008/0281687 A1 | * | 11/2008 | Hurwitz et al. ................ 705/14 |

OTHER PUBLICATIONS

Office Action (Mail Date Nov. 29, 2011) for U.S. Appl. No. 11/936,832, filed Nov. 8, 2007.

Notice of Allowance (Mail Date Jan. 29, 2013) for U.S. Appl. No. 13/611,217, filed Sep. 12, 2012, First Named Inventor Hulikunta Prahlad Raghunandan.

Office Action (Mail Date Jun. 15, 2011) for U.S. Appl. No. 11/936,832, filed Nov. 8, 2007.

Andrei Iancu, "Remarks by Director Iancu at the Intellectual Property Owners Association 46th Annual Meeting", Sep. 24, 2018, Chicago, Illinois, retrieved on Nov. 18, 2018 from the Internet: <https://www.uspto.gov/about-us/news-updates/ remarks-director-iancu-intellectual-property-owners-46th-annual-meeting> 7 pages.

* cited by examiner

| PROFILE TRAITS | ATTRIBUTES | PROFILE ATTRIBUTES VALUES | SESSION ATTRIBUTE VALUES | | | | |
|---|---|---|---|---|---|---|---|
| | | | S1 | S2 | S3 | S4 | S5 |
| ECONOMIC STRATA | VERY HIGH | 1 | 1 | 1 | | | |
| | HIGH | 4 | | | 4 | 5 | 6 |
| | MEDIUM | 9 | 9 | 9 | 9 | | |
| | LOW | 2 | | | | 1 | 1 |
| | VERY LOW | 1 | | | | | 1 |
| AGE GROUP | CHILD | 2 | 2 | 2 | 2 | | |
| | TEENAGER | 3 | 5 | 3 | 1 | 4 | 2 |
| | ADULT | 8 | 9 | 9 | 7 | 8 | 8 |
| | SENIOR CITIZEN | 7 | | 7 | 7 | 7 | |
| GENDER | MALE | 4 | | 4 | 4 | | |
| | FEMALE | 8 | 9 | 8 | 9 | 8 | 7 |
| EDUCATIONAL BACKGROUND | HIGH SCHOOL | 2 | 1 | 2 | 3 | 2 | |
| | COLLEGE | 3 | 2 | 3 | 3 | 3 | 3 |
| | UNDER GRADUATE | 6 | 7 | 8 | 5 | 6 | 4 |
| | GRADUATE | 5 | 6 | 5 | | 5 | |
| | POST GRADUATE | 4 | 2 | 5 | 4 | 4 | |
| TECHNICAL INTEREST | BASIC SCIENCES | 4 | 4 | 5 | 2 | 3 | |
| | ENGINEERING SCIENCES | 5 | 3 | 6 | 5 | 6 | 5 |
| | SOCIAL SCIENCES | 1 | | | | 1 | 1 |
| | HISTORY GEOGRAPHY | 1 | 1 | 1 | | | |
| PROFESSION | EMPLOYEE IN PRIVATE FIRM | 8 | 8 | 8 | 7 | 9 | |
| | GOVT. EMPLOYEE | 4 | 7 | 4 | 4 | 3 | 5 |
| | FREE LANCER | 4 | 4 | 4 | 4 | 4 | |
| | OWN BUSINESS | 5 | | | | 5 | 5 |
| SPECIAL INTERESTS | MOVIES | 9 | 9 | | 9 | 9 | 9 |
| | MUSIC | 8 | | 8 | 8 | 8 | 6 |
| | SPORT | 7 | 7 | | 7 | 7 | |
| | STAMPS | 1 | 1 | | | | |
| | COINS | 2 | | 2 | 2 | | |
| | PAINTINGS | 8 | | | 8 | 8 | 8 |
| | TRAVEL | 7 | | 7 | 9 | 8 | 2 |
| | PHOTOGRAPHY | 9 | 8 | 9 | 9 | 8 | 9 |

*FIG. 3*

| KEYWORDS | TIME SPENT | ATTRIBUTE | SESSION ATTRIBUTE VALUE |
|---|---|---|---|
| CAMERA | 5 OF 15 MINUTES | PHOTOGRAPHY | 6 |
| TOM CRUISE | 10 OF 15 MINUTES | MOVIES | 9 |
| MARADONA | 7 OF 15 MINUTES | SPORT | 7 |
|  |  | SOCCER | 8 |
| BMW | 2 OF 10 MINUTES | CARS | 5 |
|  |  | ECONOMIC STRATA—HIGH | 6 |
| ISAAC ASIMOV | 5 OF 6 MINUTES | BOOKS | 6 |
|  |  | SCIENCE FICTION | 8 |

*FIG. 4*

(BASED ON ISP DATA)

|     | $a_1$ | $a_2$ | $a_3$ | $a_4$ | $a_5$ | $a_6$ | $a_7$ | $a_M$ |
|-----|-------|-------|-------|-------|-------|-------|-------|-------|
| $U_1$ | 1 | 0 | 1 | 0 | 1 | 1 | 0 | 0 |
| $U_2$ | 0 | 1 | 0 | 1 | 0 | 0 | 1 | 0 |
| $U_3$ | 1 | 1 | 0 | 1 | 1 | 0 | 0 | 1 |
| $U_4$ | 1 | 1 | 0 | 1 | 1 | 0 | 1 | 0 |
|     |   |   |   |   |   |   |   |   |
|     |   |   |   |   |   |   |   |   |
|     |   |   |   |   |   |   |   |   |
| $U_N$ | 1 | 0 | 0 | 0 | 0 | 1 | 0 | 0 |

*FIG. 9*

(BASED ON DATA FROM QUESTIONNAIRES)

|     | $a_1$ | $a_2$ | $a_3$ | $a_4$ | $a_5$ | $a_6$ | $a_7$ | $a_M$ |
|-----|-------|-------|-------|-------|-------|-------|-------|-------|
| $U_1$ | 0 | 1 | 1 | 0 | 1 | 1 | 0 | 0 |
| $U_2$ | 1 | 0 | 0 | 0 | 0 | 0 | 0 | 0 |
| $U_3$ | 1 | 0 | 1 | 1 | 0 | 1 | 0 | 0 |
| $U_4$ | 0 | 1 | 0 | 1 | 1 | 0 | 1 | 0 |
|     |   |   |   |   |   |   |   |   |
|     |   |   |   |   |   |   |   |   |
|     |   |   |   |   |   |   |   |   |
| $U_N$ | 1 | 1 | 1 | 0 | 0 | 1 | 0 | 1 |

*FIG. 10*

(COMBINED DATA OF FIGS. 9 AND 10)

| | $a_1$ | $a_2$ | $a_3$ | $a_4$ | $a_5$ | $a_6$ | $a_7$ | $a_M$ |
|---|---|---|---|---|---|---|---|---|
| $U_1$ | 1 | 1 | 1 | 0 | 1 | 1 | 0 | 0 |
| $U_2$ | 1 | 1 | 0 | 1 | 0 | 0 | 1 | 0 |
| $U_3$ | 1 | 1 | 1 | 1 | 1 | 1 | 0 | 1 |
| $U_4$ | 1 | 1 | 0 | 1 | 1 | 0 | 1 | 0 |
| | | | | | | | | |
| | | | | | | | | |
| | | | | | | | | |
| $U_N$ | 1 | 1 | 1 | 0 | 0 | 1 | 0 | 1 |

*FIG. 11*

THIRD ATTRIBUTE VALUES AND TARGET ATTRIBUTE VALUES

|  | $a_1$ | $a_2$ | $a_3$ | $a_4$ | $a_5$ | $a_6$ | $a_7$ |
|---|---|---|---|---|---|---|---|
| $U_1$ | 8 | 9 | 7 | 6 | 9 | 5 | - |
| $U_2$ | 6 | 3 | 8 | 9 | 5 | 7 | - |
| $U_3$ | 2 | 8 | 6 | 2 | 7 | 9 | - |
| $U_4$ | 8 | 7 | 8 | 8 | 9 | 7 | - |
|  |  |  |  |  |  |  |  |
| TARGET PROFILE | 9 | 9 | 9 | 9 | 9 | 9 |  |

*FIG. 13*

DIFFERENCE ($\Delta V$) BETWEEN TARGET ATTRIBUTE VALUES AND THIRD ATTRIBUTE VALUES

|  | $a_1$ | $a_2$ | $a_3$ | $a_4$ | $a_5$ | $a_6$ | $a_7$ |
|---|---|---|---|---|---|---|---|
| $U_1$ | 1 | 0 | 2 | 3 | 0 | 4 | - |
| $U_2$ | 3 | 6 | 1 | 0 | 4 | 2 | - |
| $U_3$ | 7 | 1 | 3 | 7 | 2 | 0 | - |
| $U_4$ | 1 | 2 | 1 | 1 | 0 | 2 | - |
|  |  |  |  |  |  |  |  |
| TD | 3 | 3 | 3 | 3 | 3 | 3 |  |
| TD1 | 1 | 2 | 2 | 2 | 2 | 1 |  |

*FIG. 14*

STRONG ATTRIBUTES

|     | $a_1$ | $a_2$ | $a_3$ | $a_4$ | $a_5$ | $a_6$ | $a_7$ |
|-----|---|---|---|---|---|---|---|
| $U_1$ | S | S | S |   | S |   | - |
| $U_2$ |   |   | S | S |   |   | - |
| $U_3$ |   | S |   | S | S |   | - |
| $U_4$ | S | S | S | S | S |   |   |
|     |   |   |   |   |   |   |   |
| TD1 | 1 | 2 | 2 | 2 | 2 | 2 |   |

*FIG. 15*

STRONG, MEDIUM, AND WEAK ATTRIBUTES

|     | $a_1$ | $a_2$ | $a_3$ | $a_4$ | $a_5$ | $a_6$ | $a_7$ |
|-----|---|---|---|---|---|---|---|
| $U_1$ | S | S | S | M | S | W | - |
| $U_2$ | M | W | S | S | M | M | - |
| $U_3$ | W | S | M | W | S | S | - |
| $U_4$ | S | S | S | S | S | M | - |
|     |   |   |   |   |   |   |   |
| TD1 | 1 | 2 | 2 | 2 | 2 | 1 |   |
| TD2 | 4 | 5 | 6 | 5 | 4 | 3 |   |

*FIG. 16*

RATIO (R) USING STRONG, MEDIUM, AND WEAK ATTRIBUTES

|  | $N_S$ | $N_M$ | $N_W$ | C | R (D=30) |
|---|---|---|---|---|---|
| $U_1$ | 4 | 1 | 1 | 47 | 1.57 |
| $U_2$ | 2 | 2 | 2 | 32 | 1.07 |
| $U_3$ | 3 | 1 | 2 | 37 | 1.23 |
| $U_4$ | 5 | 1 | 0 | 55 | 1.83 |

IDENTIFICATION OF USERS FOR ADVERTISING PURPOSES

BACKGROUND OF THE INVENTION

Internet web sites display many different types of information to Internet users. Depending on the nature of the web site, users may be provided with news or sports headlines, weather updates, product information and pricing, opinions on general interest topics, and detailed discussions pertaining to special interest groups. Virtually every conceivable topic of interest has at least one web site dedicated to the topic. Furthermore, web sites more and more display numerous advertising banners and associated links.

Just as there is a variety of Internet users, there is a corresponding variety in sites on the Internet. People accessing the Internet vary widely in age, occupation, income, education, culture and interests. Advertising material promoted on a web site may be of little interest or relevance to the user. The result is that the user ignores the advertising or may even be sufficiently perturbed by its content to avoid future visits to the site. The content provided may even be offensive to certain people accessing a particular site.

Thus, there is a need for a method and system that overcomes at least one of the aforementioned disadvantages of the prior art.

SUMMARY OF THE INVENTION

The present invention provides a method for identifying users for advertising purposes, said method comprising:

identifying a plurality of users and a plurality of attributes, each attribute being a subject, an activity, or a demographic characteristic;

identifying a first network of first web sites of the Internet accessed by the plurality of users, said access to the first web sites provided to the plurality of users by a first at least one Internet Service Provider (ISP);

receiving, from the first at least one ISP, first data comprising content of the first web sites and time data pertaining to when each user of the plurality of users accessed the first web sites;

analyzing the first data to determine first attribute values comprising a first value of each attribute of the plurality of attributes for each user, said first value being indicative of a level of interest in each attribute by each user, said analyzing based on an amount of time spent by each user at each website of the first web sites in relation to the content of each website of the first web sites;

identifying a second network of second web sites of the Internet accessed by the plurality users, said access to the second web sites provided to the plurality of users by a second at least one ISP;

deriving, from questionnaires completed by the plurality of users, second attribute values comprising a second value of each attribute of the plurality of attributes for each user, said second value being indicative of a level of interest in each attribute by each user, attribute values of said second attribute values having been indicated on the questionnaire by the users of the plurality of users for each attribute to which a keyword relevant to the second web sites has been mapped;

determining third attribute values that comprise a third value of each attribute of the plurality of attributes for each user, by combining the first attribute values for each user with the second attribute values for each user;

processing the third attribute values, said processing comprising determining from the third attribute values an identification of a subset of the plurality of users to whom advertising of a product or service may be directed; and communicating the identification of the subset of the plurality of users to a provider of the product or service.

The present invention provides a method and system that overcomes at least one of the disadvantages of the prior art.

BRIEF DESCRIPTION OF THE DRAWINGS

FIG. 3 is a table of attributes stored in a user's profile, in accordance with an embodiment of the present invention.

FIG. 4 is a table of mappings between keywords and user attributes, in accordance with a preferred embodiment.

FIGS. 9-11 are tables depicting binary attribute values derived from Internet Service Provider (ISP) data, questionnaires, and a combination of the attribute values derived from the ISP data and the questionnaires, in accordance with embodiments of the present invention.

FIGS. 13-17 comprise tables illustrating the method of FIG. 12, in accordance with embodiments of the present invention.

DETAILED DESCRIPTION OF THE INVENTION

Figure 1:
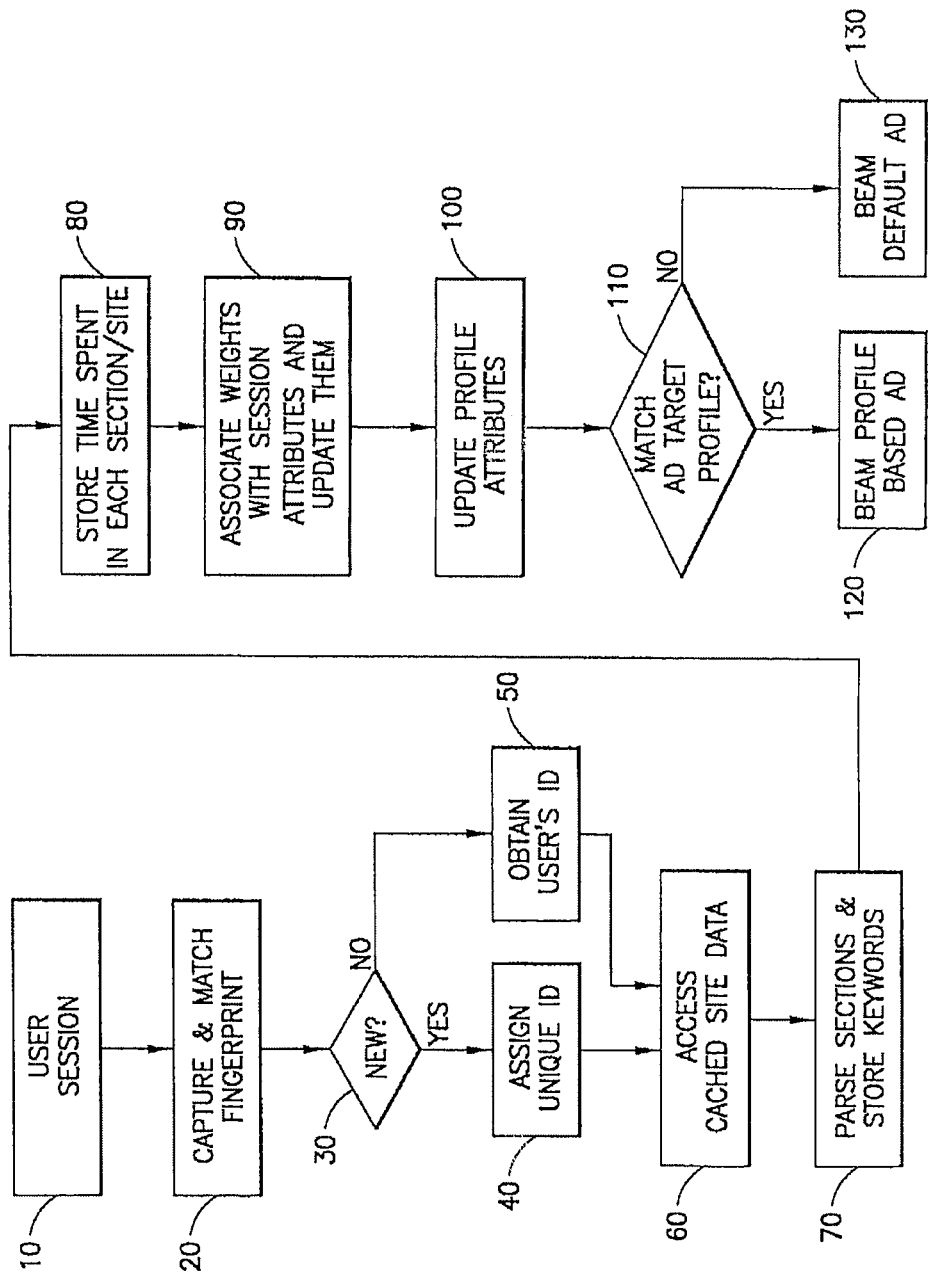
FIG. 1 is a flow diagram of a method of tailoring advertising to suit a user, in accordance with embodiments of the present invention.

The present invention method and system for identifying users for advertising purposes (i.e., for directing advertising content to such identified users), based on user interest profiles obtained through use of networked environments such as the Internet. A user's interest profile may be generated from user data obtained from a combination of different sources relating to the user's use of the Internet. A first source is the Internet user's network usage data as provided by an Internet Service Provider (ISP) who provides the user with access to the Internet. A second source is a questionnaire completed by the user regarding the user's interests in relation to alternative Internet usage for which the ISP does not provide pertinent user data. Such alternative Internet usage pertains to Internet mechanisms such as blogs, web forums, web newsgroups, web portals, etc.

The detailed description herein is divided into the following Sections:

1. Obtaining user data from Internet Service Providers;
2. Obtaining user data from questionnaires completed by users;
3. Combining usage data obtained from Internet Service Providers and from questionnaires;
4. Processing the combined usage data to identify users for advertising purposes; and
5. Method for determining users to whom advertising may be directed.

1. Obtaining User Data from Internet Service Providers

Acquiring a user's network usage information is performed by recording details about sites the user searches or has visited. More specifically, section headings and keywords off sites visited or searched can be recorded. This recorded information is allocated to one or more attribute record. The attributes are pre-defined. Typically, the attributes are selected from the group consisting of economic stratum, age group, sex, educational background, occupation, religious background, personal technical interests and personal special interests. Each instance of acquired data is weighted with reference to its allocated attributes, and from this the user profile can be generated. The weighting can be performed on the basis of time spent, or the frequency of visits to various sites. Their users profile can be continuously updated with subsequent usage (i.e., sessions).

The user profile can be specific to an individual person, and in that case requires the acquisition of identification data from the user. Such data can be acquired by one or more of the processes of acquiring a user s fingerprint, acquiring a user s retinal pattern or acquiring a user s voice pattern. Alternatively, the user s profile can be specific only to a demographic grouping, and the identification data is broadly characterizing. Such characterizing identification data can be obtained by capturing a video image of a portion of the user s body, including the head. Such video information is processed to extract information which includes one or more of sex and age.

The information provided to the user on the basis of his or her profile may include advertisements or other information.

FIG. 1 is a flow diagram of a method of tailoring advertising to suit a user, in accordance with embodiments of the present invention. A user session 10 begins with a user utilizing a computer to access the Internet. The user's fingerprints are captured in step 20. The fingerprints may be optionally acquired by a scanning device located in the computer keyboard or, alternatively, in the computer mouse. Such scanning may be undertaken using the photocell prism technique that is well known in the art and is disclosed, for example, in U.S. Pat. No. 4,455,083 (issued to Paul B. Elmes, issued on Jun. 19, 1984). Other techniques and equipment for acquiring fingerprints, as would be apparent to one skilled in the art, may be used without departing from the spirit and scope of the invention.

The acquired fingerprints are passed to application software or a browser using an enhanced computer mouse or keyboard device driver. An attempt is made by the application software to match the acquired fingerprints with known sets of fingerprints in step 20. The known sets of fingerprints may be stored in a database. The database may be located on a server. A determination is made in step 30 as to whether the user is new or already known to the system. If the user is new, a unique identifier is assigned to the user in step 40. If the user is recognized as being known to the system, the user s existing identifier is retrieved in step 50, using the matched fingerprints from step 20.

As the user navigates the Internet and browses various sites, the content of each site visited is stored in a cache in step 60. Steps 60 and 70 obtain user site visitation data from the Internet Service Provider providing the user with access to the Internet. Storing each visited site in cache allows data to be extracted from each site in step 70, while the user session continues. Each site which a user visits is parsed; section headings and words in bold type are identified and stored as keywords in a database. The time spent at each site, and within sections of a site, is logged in step 80. An embodiment of the invention captures user data over time in an unobtrusive manner; information is not solicited from the user. The user may optionally provide fingerprint and user profile information. Where a fingerprint database containing user profiles and background exists, the advertising can be tailored more accurately to suit the user s profile. This is particularly the case when such a fingerprint database is, or can communicate with, a centralized database containing Social Security numbers or credit profiles. It is to be noted, however, that such extended functionality is subject to privacy laws applicable in the region.

Various session and profile attributes associated with a user are defined. These may include economic/social stratum, age group, sex, educational background, occupation/profession, religious background and special interests or hobbies.

Having accumulated data in steps 70 and 80 pertaining to the type of Internet sites visited and the length of time spent at each site, weights are assigned in step 90 to various session attributes. The weights are used as a determination of the user s level of interest in each session attribute and may be derived from time spent in particular sections in specific sites in a particular session. Thus, a high level of interest in a particular session attribute may result in a weight of 10 being assigned to that attribute, whereas an attribute in which the user has little or no interest may result in a weight of 1.

The identifier associated with the user in steps 40 and 50 is used to associate the user with a profile. Having assigned weights to various session attributes in step 90, the attributes in the user s profile are updated in step 100. By accumulating data over a number of sessions, the user s profile may become quite detailed and accurately identify the user s tastes and interests.

A determination is made in step 110 as to whether the user s profile matches a target profile for particular advertising to be displayed on the Internet site currently being visited by the user. If the user s profile does match the desired advertising profile, a tailored advertisement is presented to the user in step 120. As the advertisement directly appeals to the user s profile, including interest and budget, more sales typically result. If the user s profile does not match the advertising profile, a generic advertisement may be presented to the user in step 130.

Once a user has a profile stored in the system, all future connections to the Internet may be tailored in accordance with the user s known interests. Furthermore, future visits to Internet sites ensure that the user s profile is continually updated and refined so that the advertising directly targets the user s current interests and spending patterns.

It will be apparent to one skilled in the art that further embodiments may be practiced using retinal scans or voice recognition to uniquely identify the user. In the above example, an individual user s profile was constructed and updated by monitoring the user s internet usage.

Figure 2:
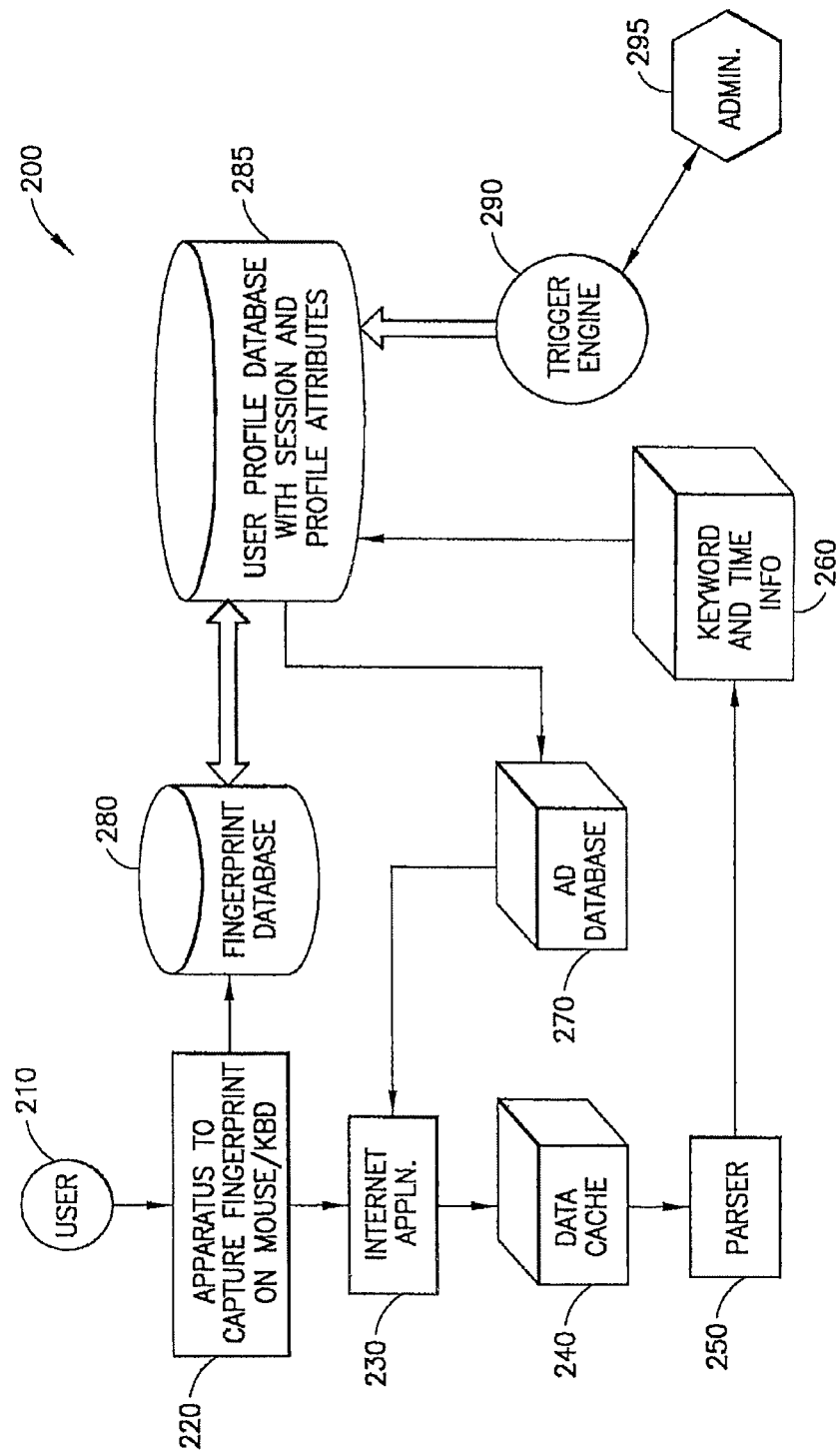
FIG. 2 is a schematic block diagram representation of an apparatus, in accordance with an embodiment of the present invention.

FIG. 2 is a schematic block diagram representation of an apparatus comprising a system 200, in accordance with embodiments of the present invention. The apparatus 200 may be comprised by the computer system 500 described infra in conjunction with FIG. 5, or alternatively by the computer system 99 described infra in conjunction with FIG. 6, for implementing the present invention. A user 210 interacts with a module 220, which in a preferred embodiment is an enhanced keyboard or computer mouse. The module 220 includes means for acquiring the user s fingerprints. Having acquired the user s fingerprints, the module 220 sends a query to a fingerprint database 280 to determine whether the user 210 is known to the system 200. The fingerprint database 280 interacts with a user profile database 285 via a duplex connection. The user profile database 285 stores session and profile attributes specific to identifiable users. The user profile database 285 provides information to an Ad database 270. The Ad database 270 uses the information from the user profile database 285 to customize advertising which is to be displayed on Internet web sites.

The module 220 also interacts with an Internet Application 230. The Internet Application 230 is used to navigate among different web sites on the Internet. The Internet Application 230 receives customized advertising from the Ad database 270.

Each site visited by the user 210 using the Internet Application 230 is stored in a data cache 240. The data cache 240 supplies the content from the web sites visited by the user 210 to a parser 250. The parser 250 identifies section headings and highlighted text as keywords. The parser 250 also monitors the time the user 210 spends at each web site visited. The parser 250 provides the keywords and timing information to the keyword and time information entity 260. The keyword and time information entity 260 provides information to the user profile database 285 to update the user s profile and session attributes.

In one embodiment, a trigger engine 290 may update users' session attributes stored in the user profile database 285. The trigger engine 290 can skew the weights associated with session attributes for all or individually identified users. The trigger engine 290 identifies universal trends across session attributes of many users. These universal trends could be influenced by local, national or international events pertaining to sport, politics, or weather. The trigger engine 290, on identifying universal trends, may optionally interact with an administrator 295 so that appropriate manual correction of user profiles may be made.

FIG. 3 is a table of attributes depicting a sample user profile derived over a period of five sessions, in accordance with embodiments of the present invention. The fields are only illustrative and should not be considered as a limitation. Furthermore, each attribute may optionally be associated with sub-attributes and profile and session values. The first column of the table shows seven profile traits: economic strata, age group, gender, educational background, technical interest, profession and special interests. These profile traits are divided into a number of attributes, which appear in the second column. For example, the economic strata profile trait is divided into attributes of very high, high, medium, low and very low. Similarly, special interests are divided into movies, music, sport, stamps, coins, paintings, travel and photography.

A weighting, described as the profile attribute value, is associated with each attribute and appears in the third column. The weightings are derived from the session attribute values, acquired over five sessions, which appear in the next five columns. In each session, a weight is assigned to each attribute relevant to the specific session.

Examining the profile trait "gender", it is readily seen that the possible attributes are male and female. In each of the five sessions, relatively high weights were assigned to the attribute female. The attribute male was only assigned weights in two of the five sessions, and the weights assigned were relatively low. The weights are assigned based on the amount of time spent at sites which are classified as appealing to males or females, respectively. It appears very likely from the data that the user is a female.

In the first session, a weight of 9 was assigned to the attribute Movies, indicating that the user spent a significant amount of the user session looking at movie related web sites. No weight was assigned to the Attribute Movies for the second session, indicating that no relevant web site was visited. The third, fourth and fifth user session also recorded weights of 9 for Movies, indicating that the user has a strong interest in movies. The Profile Attribute Value stored in the user profile is, therefore, 9, indicating a high overall interest in movie-related web sites. The user visited a stamp-related site briefly in the first session and has not visited a stamp-related site in the succeeding sessions, so the Profile Attribute Value for Stamps is 1, indicating an overall low interest in that topic. Advertisers are able to use this information and customize the advertising presented to the user via the Internet. For example, the advertising banners on a search engine may display information about new release movies or videos and associated merchandising.

FIG. 4 is a table showing the mapping of keywords to user attributes for a sample user. in accordance with embodiments of the present invention. Keywords are extracted by a parser from Web site content stored in a cache. In the first row of the table, the word Camera was identified as a keyword and the user spent 5 of 15 minutes on web sites or in sections of web sites containing the keyword. The keyword camera is mapped to the special interest attribute of photography and is assigned a weight of 6, based on the relative time spent by the user at sites containing the keyword camera.

The third keyword Maradona is mapped to the attributes Sport and Soccer. Appropriate weightings are then assigned based on the time spent visiting sites containing the keyword Maradona. As soccer is more specific than sport, it receives a slightly higher weight as a measure of the user s specific interest in soccer. Similarly, the keyword BMW is mapped to the attributes Cars and Economic Strata High and relevant weights assigned.

In the case where a user is identified only by a demographic grouping, then user characterizing data is acquired. This is done, in one embodiment, by capturing a video image of the user s body, including the head, from which demographic information can be discerned.

Techniques of facial recognition will be known to those skilled in the art, as will be the processes associated with discriminating an individual into one or more demographic groupings.

In embodiments in which individual users are categorized as belonging to a particular demographic, the Internet usage patterns of all users within the same demography contribute to the construction of that demographic profile, and thus to the style and content of advertising that will be presented to all members of the demographic.

The teaching given above relating to the acquisition of usage data, generation of a user profile, and updating thereof with continuing usage is equally applicable here.

Consider the following demographic groupings: Adult, Child, Male, Female, Adolescent, Student and Professional. Any single user will be grouped into at least two of these profiles. The manner in which advertisement URLs are mapped to each grouping is to (i) associate URLs which contain the group name as a part of the URL, (ii) associate URLs which are synonyms of the group name, or (iii) associate URLs which are already established in the electronic media or in authorized resources as being targeted to this demographic group (i.e. the URL.com may have an advertisement).

The allocation of a user to particular demographic groups can also be weighted in accordance with the user s level of interest in specific sites, as discussed above.

An advantage of the invention is that owners and operators of Internet web sites are able to attract more sources of advertising based on the operator's ability to deliver dynamic target audiences. By consulting with companies wishing to advertise their goods and/or services, web site operators are able to assign a profile to each good or service being promoted. Goods and services may then be matched to a user s profile to ensure that a company with a range of products catering to different demographics is able to promote the product which best suits the user.

As many user profiles are generated over time, important statistical analyses can be performed using the acquired data. This may be used to further tailor the advertising content presented to different web sites.

Figure 5:
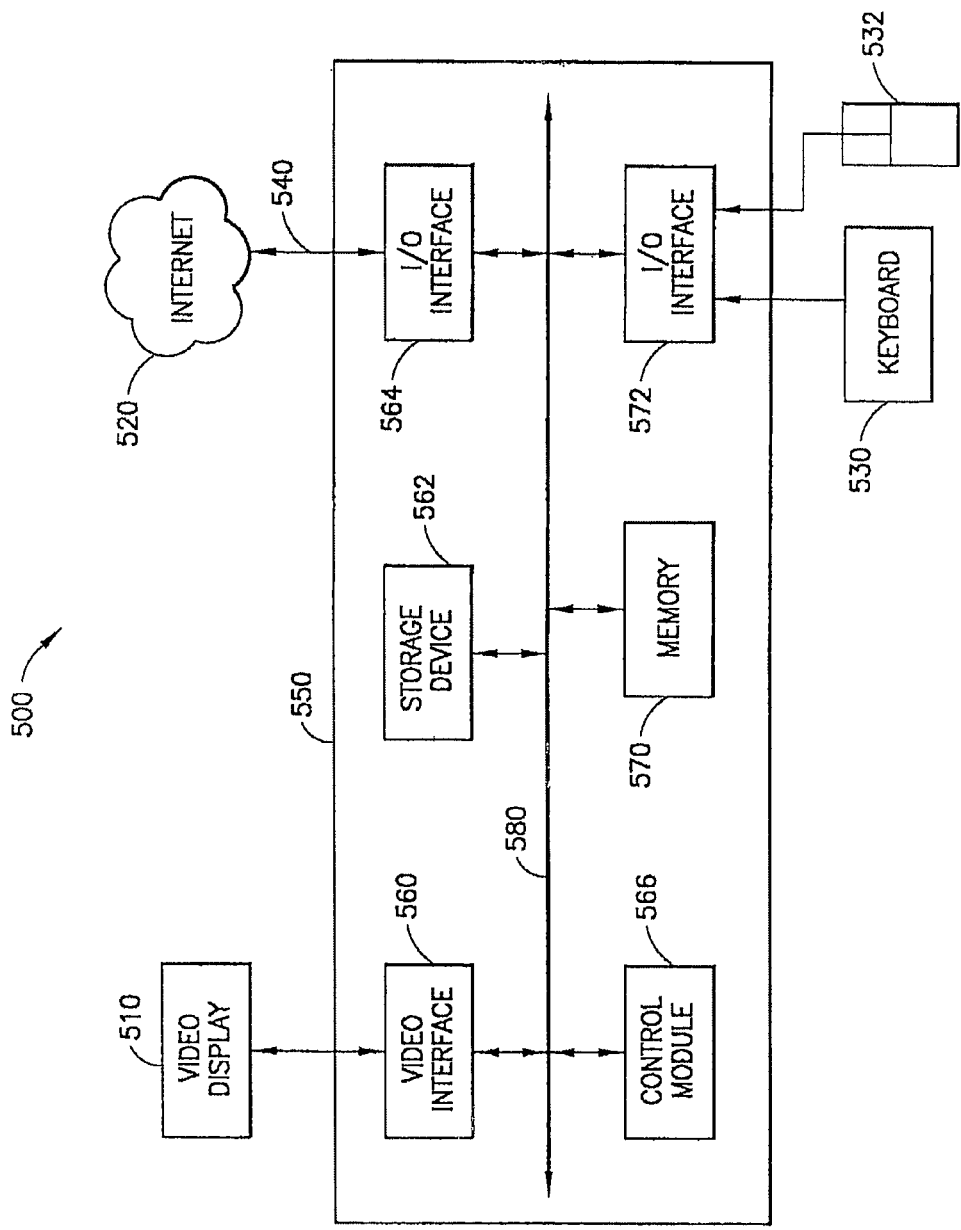
FIG. 5 depicts a computer platform upon which the present invention may be practiced, in accordance with a preferred embodiment.

FIG. 5 depicts a computer platform upon which the present invention may be practiced, in accordance with a preferred embodiment. The process for providing tailored information for a user via the Internet can be implemented using a computer program product in conjunction with a computer system 500 as shown in FIG. 5. In particular, the apparatus for acquiring a user s profile data (e.g., the apparatus 200 of FIG. 2 which may be comprised by the computer system 500), associating the acquired data with a user profile and providing information to the user based on the associated user profile can be implemented as software, or computer readable program code, executing on the computer system 500.

The computer system 500 includes a computer 550, a video display 510, and input devices 530, 532. In addition, the computer system 500 can have any of a number of other output devices including line printers, laser printers, plotters, and other reproduction devices connected to the computer 550. The computer system 500 can be connected to one or more other computers via a communication input/output (I/O) interface 564 using an appropriate communication channel 540 such as a modem communications path, an electronic network, or the like. The network may include a local area network (LAN), a wide area network (WAN), an Intranet, and/or the Internet 520.

The computer 550 includes the control module 566, a memory 570 that may include random access memory (RAM) and read-only memory (ROM), input/output (I/O) interfaces 564, 572, a video interface 560, and one or more storage devices generally represented by the storage device 562. The control module 566 is implemented using a central processing unit (CPU) that executes or runs a computer readable program code that performs a particular function or related set of functions.

The video interface 560 is connected to the video display 510 and provides video signals from the computer 550 for display on the video display 510. User input to operate the computer 550 can be provided by one or more of the input devices 530, 532 via the I/O interface 572. For example, a user of the computer 550 can use a keyboard as I/O interface 530 and/or a pointing device such as a mouse as I/O interface 532. The keyboard and the mouse provide input to the computer 550. In a first embodiment, the user s fingerprints may be acquired via a scanning device located in either one or both of the keyboard and the mouse. In a second embodiment, the user s voice pattern may be acquired via a sound card equipped with digital signal processing software located in the computer 550. In a third embodiment, the user s retina may be scanned by a scanning device connected to the computer 550. In a fourth embodiment, a video camera connected to the computer 550 may be used to capture a video image of the user.

The storage device 562 can consist of one or more of the following: a floppy disk, a hard disk drive, a magneto-optical disk drive, CD-ROM, magnetic tape or any other of a number of non-volatile storage devices well known to those skilled in the art. Each of the elements in the computer system 550 is typically connected to other devices via a bus 580 that in turn can consist of data, address, and control buses.

In particular, the software may be stored in a computer readable medium, including the storage device 562 or that is downloaded from a remote location via the interface 564 and communications channel 540 from the Internet 520 or another network location or site. The computer system 500 includes the computer readable medium having such software or program code recorded such that instructions of the software or the program code can be carried out. The use of the computer system 500 preferably affects advantageous apparatuses for constructing a runtime symbol table for a computer program in accordance with the embodiments of the invention.

The computer system 500 is provided for illustrative purposes and other configurations can be employed without departing from the scope and spirit of the invention. The foregoing is merely an example of the types of computers or computer systems with which the embodiments of the invention may be practiced. Typically, the processes of the embodiments are resident as software or a computer readable program code recorded on a hard disk drive as the computer readable medium, and read and controlled using the control module 566. Intermediate storage of the program code and any data including entities, tickets, and the like may be accomplished using the memory 570, possibly in concert with the storage device 562.

In some instances, the program may be supplied to the user encoded on a CD-ROM or a floppy disk (both generally depicted by the storage device 562), or alternatively could be read by the user from the network via a modem device connected to the computer 550. Still further, the computer system 500 can load the software from other computer readable media. This may include magnetic tape, a ROM or integrated circuit, a magneto-optical disk, a radio or infra-red transmission channel between the computer and another device, a computer readable card such as a PCMCIA card, and the Internet 520 and Intranets including email transmissions and information recorded on Internet sites and the like. The foregoing are merely examples of relevant computer readable media. Other computer readable media may be practiced without departing from the scope and spirit of the invention.

The apparatus for acquiring user profile data and providing information to the user based on the associated user profile can be realized in a centralized fashion in one computer system 500, or in a distributed fashion where different elements are spread across several interconnected computer systems.

Computer program means or computer program in the present context mean any expression, in any language, code or notation, of a set of instructions intended to cause a system having an information processing capability to perform a particular function either directly or after either or both of the following: a) conversion to another language, code or notation or b) reproduction in a different material form.

Figure 6:
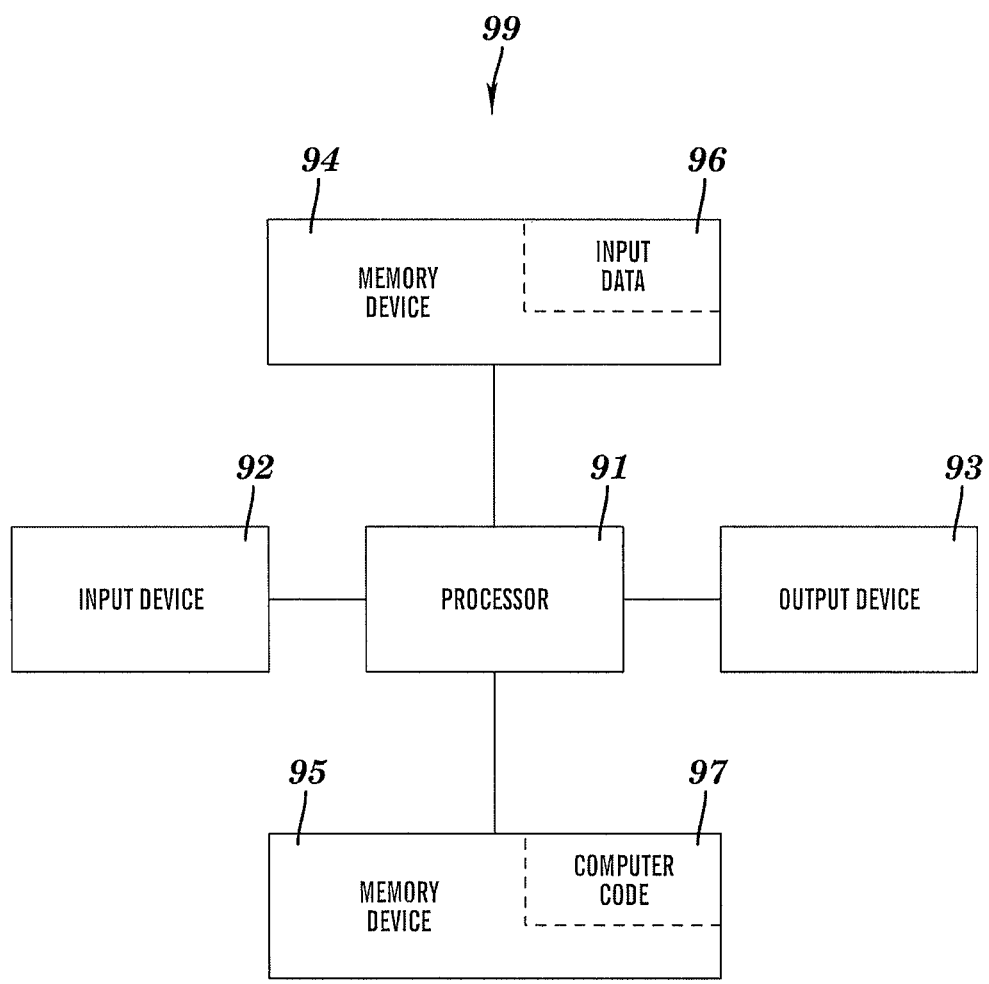
FIG. 6 illustrates a computer system 99 used for identifying users for advertising purposes, in accordance with embodiments of the present invention.

FIG. 6 illustrates a computer system 99 used for identifying users for advertising purposes, in accordance with embodiments of the present invention. The computer system 99 of FIG. 6 represents an alternative to, or a modification of, the computer system 500 of FIG. 5. In FIG. 6, the computer system 99 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes an algorithm for identifying users for advertising purposes. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may be used as a computer usable storage medium (or program storage device) having a computer readable program embodied therein and/or having other data stored therein, wherein the computer readable program comprises the computer code 97. Generally, a computer program product (or, alternatively, an article of manufacture) of the computer system 99 may comprise said computer usable storage medium (or said program storage device).

Thus the present invention discloses a process for supporting computer infrastructure, integrating, hosting, maintaining, and deploying computer-readable code into the computer system 99, wherein the code in combination with the computer system 99 is capable of performing a method for identifying users for advertising purposes.

Any of the components of the present invention could be created, integrated, hosted, maintained, deployed, managed, serviced, supported, etc. by a service provider who offers to facilitate identifying users for advertising purposes. Thus the present invention discloses a process for deploying or integrating computing infrastructure, comprising integrating computer-readable code into the computer system 99, wherein the code in combination with the computer system 99 is capable of performing a method for identifying users for advertising purposes.

In another embodiment, the invention provides a business method that performs the process steps of the invention on a subscription, advertising, and/or fee basis. That is, a service provider, such as a Solution Integrator, could offer to facilitate identifying users for advertising purposes. In this case, the service provider can create, integrate, host, maintain, deploy, manage, service, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 6 shows the computer system 99 as a particular configuration of hardware and software, any configuration of hardware and software, as would be known to a person of ordinary skill in the art, may be utilized for the purposes stated supra in conjunction with the particular computer system 99 of FIG. 6. For example, the memory devices 94 and 95 may be portions of a single memory device rather than separate memory devices.

Figure 7:
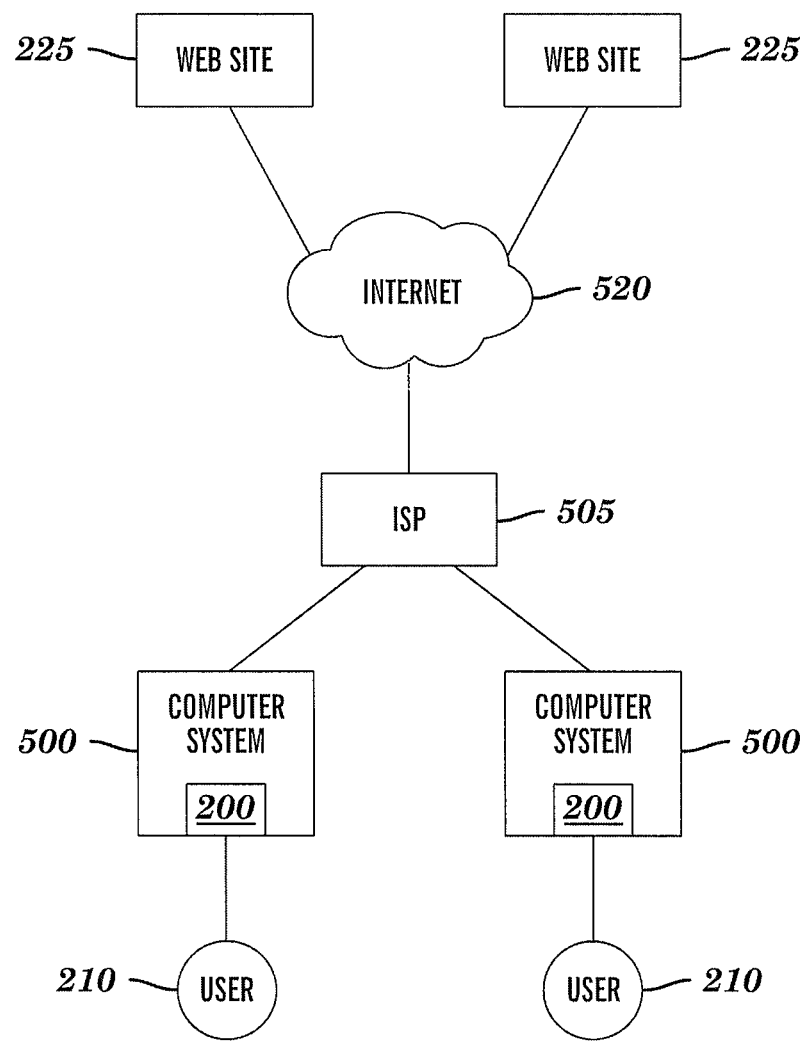
FIG. 7 depicts a network diagram, in accordance with embodiments of the present invention.

FIG. 7 depicts a network diagram, in accordance with embodiments of the present invention. The network diagram of FIG. 7 comprises the Internet 520 to which the web sites 225 are connected, an Internet Service Provider 505 which provides access for the users 210 to the Internet 520 and to the web sites 225, and the computer systems 500 (See FIG. 5) each comprising the apparatus 200 (see FIG. 2) where the apparatus 200 connects the users 210 to the Internet 520 via the Internet Service Provider 505, or alternatively the computer system 99 (see FIG. 6) in substitution for each computer system 500.

Although the user profiles generated from user data obtained from the Internet Service Provider may be beneficially used for advertising purposes as described supra, the user profiles may be enhanced by user data obtained from questionnaires completed by the user in relation to alternative Internet usage for which the ISP does not provide pertinent user data.

2. Obtaining User Data from Questionnaires Completed by Users

Alternative Internet usage comprises user participation in social networks pertaining to alternative web sites such as blogs, web forums, web newsgroups, web portals, etc. User participation in such social networks may be indicative of user interests and thus be helping to identify users for advertising purposes. Although these social networks are known to the users, the ISP may not provide pertinent user data relating to user participation in these social networks for various reasons. A first reason is that the ISP may be unable to provide pertinent user data relating to user participation in these social networks, due to privacy laws that preclude particular information from being accessed or distributed. A second reason is that the ISP may be unable to provide pertinent user data relating to user participation in these social networks due to the fact that some users may want to divulge information regarding their participation in social networks in a manner that such information is not directly accessible by the ISP. A third reason is that, since keywords are used to parse sites and sections of web sites as described supra, there may be an unacceptable level of uncertainty and associated inaccuracy of the user profile information derived from the user data.

Accordingly, attribute values are obtained from questionnaires completed by the users and the attribute values from the questionnaires are combined with the attribute values derived from user data supplied by the ISP (see Section 1) to arrive at a combined set of attribute values which may be processed to determine users to whom advertising may be beneficially directed. The list of attributes used for processing the data supplied by the ISP and for processing the data obtained from the alternative Internet usage at the alternative web sites is a predetermined list of attributes that has been identified.

Figure 8:
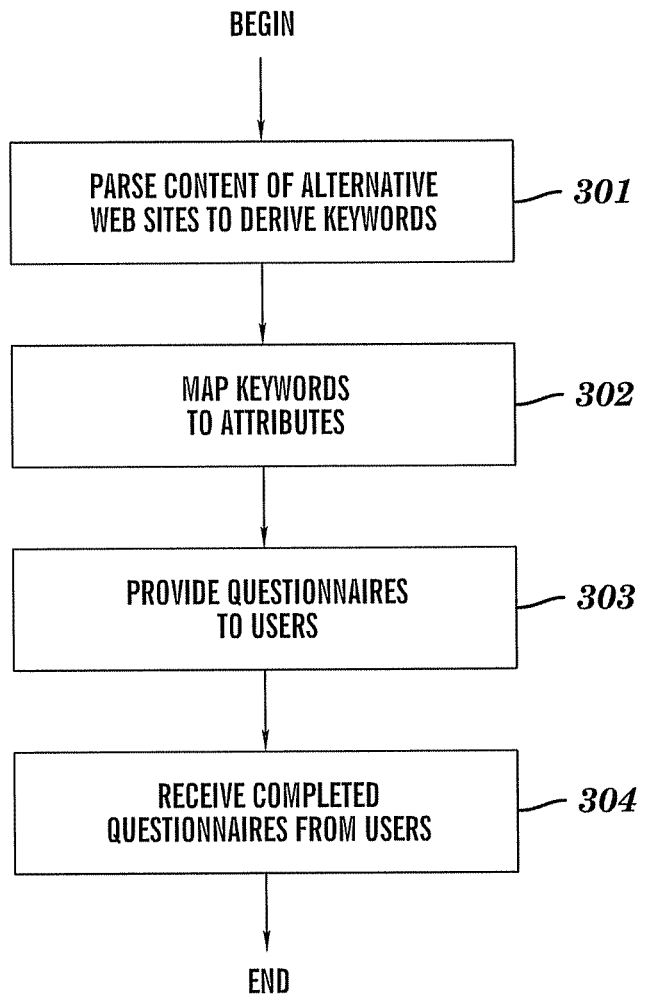
FIG. 8 is a flow chart describing how user data is obtained from Internet user usage of alternative web sites, in accordance with embodiments of the present invention.

FIG. 8 is a flow chart describing how user data is obtained from Internet user usage of alternative web sites, in accordance with embodiments of the present invention. The process of FIG. 8 comprises steps 301-304. The alternative web sites comprise web forums, web newsgroups, web portals, etc. The predetermined list of profile attributes has been established (prior to execution of steps 301-304) and is the same list of profile attributes (see FIG. 3) as was used in conjunction with the user data provided by the ISP as described supra in Section 1.

Step 301 parses the content of the alternative web sites to derive keywords. The parser 250, described supra in conjunction with FIG. 2, may be employed to parse the content of the alternative web sites and derive keywords using methodology similar to that explained supra. For example, the keywords may be derived from section headings and/or bolded text in the content of the alternative web sites.

Step 302 maps the keywords derived in step 301 to the list of attributes, which is analogous to the mapping depicted in FIG. 4 as described supra. However, values for the attributes shown in FIG. 4 are not yet known and will be generated in steps 303-304. For some attributes of the predetermined list of profile attributes, there will not be a mapped keyword resulting from step 302 pertaining to the alternative web sites. Similarly, for some attributes of the predetermined list of profile attributes, there will not be a mapped keyword from the mapping depicted in FIG. 4 pertaining to the web sites associated with the data supplied by the ISP. For both the alternative web sites and the web sites associated with the data supplied by the ISP, whether or not a given attribute of the predetermined list of profile attributes has a keyword mapped thereto depends on the content of the respective websites, since the content of each web site determines the keywords pertaining to each website.

Step 303 provides the users with questionnaires and requests the users to complete the questionnaires by indicating values for the profile attributes derived in step 302. For example, the users may be prompted to indicate a value in the range of 1 to 10 for each attribute to indicate the intensity of relevance of each attribute for each user, which is analogous to the attribute values shown in FIG. 4. In one embodiment, the questionnaire has a form of a table comprising the "Attribute" and "Session Attribute Value" column of Table 4, wherein the attributes are listed in the "Attribute" column and the user is prompted to fill in the attribute values in the "Session Attribute Value" column. Generally, the questionnaire may be structured in any format in which the user is requested to supply an attribute value for each attribute to which there is a mapped keyword from step 302.

For both the alternative web sites and the web sites associated with the data supplied by the ISP, the attributes to which there are no mapped keywords are assigned the minimum possible attribute value from the range of possible attribute values. In one embodiment, the minimum possible attribute value is 1 in conjunction with a range of possible attribute values of 1 to 10.

Step 304 receives the completed questionnaires from the users, wherein the completed questionnaires comprise the attribute values indicated by the users.

3. Combining Usage Data Obtained from Internet Service Providers and from Questionnaires After the methodology described supra in Sections 1 and 2 has been executed, there is a plurality of attributes and two sets of corresponding attribute values, namely a first set of attribute values derived from data provided by the ISP with respect to a first network of web sites (as described supra in Section 1) and a second set of attribute values derived from questionnaires completed by users with respect to a second network of web sites (i.e., blogs, web forums, web newsgroups, web portals, etc., as described supra in Section 2). The description next describes combining the first and second sets of attribute values to generate a third set of attribute values.

The first and second sets of attribute values may be the same values as determined by the methodology of Sections 1 and 2 (e.g., values analogous to the attribute values shown in FIG. 4). or alternatively may be further processed to another form.

In one embodiment, the attribute values may be converted to binary numbers (i.e., 0 or 1). For example, each attribute value not exceeding 5 is converted to 0, and each attribute value exceeding 5 is converted to 1.

Let $U_1, U_2, U_3, \ldots U_N$ represent N users;

Let $a_1, a_2, a_3, \ldots a_M$ represent M attributes of these N users.

Let $S_1, S_2, S_3$ denote the first, second, third sets of attribute values, respectively.

Let $V_{nm,k}$ represent the attribute value for attribute m of user n in set $S_k$ (n=1, 2, ... N; and m=1, 2, ..., M; and k=1, 2, 3).

For illustration purposes, FIGS. 9-11 are tables depicting binary attribute values derived from ISP data, questionnaires, and a combination of the attribute values derived from the ISP data and the questionnaires, in accordance with embodiments of the present invention. FIGS. 9, 10, and 11 respectively depict the attribute values for the set $S_1$, $S_2$, $S_3$ represented as $V_{nm,k}$ for k=1, 2, 3, respectively, wherein $V_{nm,3}$ is computed according to $V_{nm,3}=V_{mm,1}$ OR $V_{nm,2}$; i.e., $V_{nm,3}$ is computed as a logical OR between $V_{nm,1}$ and $V_{nm,2}$ for all combinations of m and n. In other words, FIG. 9 depicts attribute values of the first set $S_1$ as binary values derived from ISP data (see Section 1), FIG. 10 depicts attribute values of the second set $S_2$ as binary values derived from completed questionnaires (see Section 2), and FIG. 11 depicts a combination of the attribute values in FIGS. 9 and 10 as the logical OR between the binary attribute values pertaining to the first set ($S_1$) and the second set ($S_2$).

In one embodiment, the attribute values are real numbers or positive integers such as the attribute values in the table of FIG. 4, wherein $V_{nm,3}$ may be computed as a weighted sum of a function $F(V_{nm,1})$ of $V_{nm,1}$ and the function $F(V_{nm,2})$ of $V_{nm,2}$, for n=1, 2, ... N and m=1, 2, ..., M, as indicated in Equation (1).

$$V_{nm,3}=W_{m,1}*F(V_{nm,1})+W_{m,2}*F(V_{nm,2}) \tag{1}$$

wherein $W_{m,k}$ is a weight that acts as a multiplier on $F(V_{nm,k})$ for k=1, 2. The weight $W_{m,k}$ may be a function of attribute by varying with the index m. The weight $W_{m,k}$ may be a function of network by varying with the index k (i.e., the weight $W_{m,k}$ may differ for the first network and the second network for a given attribute m).

In one embodiment, $W_{m,k}$ varies with both m and k.

In one embodiment, $W_{m,k}$ varies with m but does not vary with k.

In one embodiment, $W_{m,k}$ does not vary with m but varies with k.

In one embodiment, $W_{m,k}$ is constant and does not vary with either m or k.

In one embodiment, $F(V_{nm,k})$ is a linear function of $V_{nm,k}$ such that Equation (1) becomes:

$$V_{nm,3}=W_{m,1}*V_{nm,1}+W_{m,2}*V_{nm,2} \tag{2}$$

In Equation (2), the weights $W_{m,1}$ and $W_{m,2}$ may be normalized such that $(W_{m,1})^2+(W_{m,2})^2=1$.

In one embodiment, $F(V_{nm,k})$ is a nonlinear function of $V_{nm,k}$. As an example, $F(V_{nm,k})$ may have the form of $F(V_{nm,k})=(V_{nm,k})^P$ wherein the power P is a positive real number subject to P≠1. For example, P may have such values as: 0<P<1, P=1/2, P>1, P=3/2, P=2, P=3, etc.

4. Processing the Combined Usage Data to Identify Users for Advertising Purposes Section 3 has described supra combining the first and second sets of attribute values to generate a third set of attribute values. The first set of attribute values was derived from data provided by the ISP (or a plurality of ISPs) with respect to a first network of web sites (as described supra in Section 1. The second set of attribute values was derived from questionnaires completed by users with respect to a second network of web sites (i.e., blogs, web forums, web newsgroups, web portals, etc., as described supra in Section 2). The third set of attribute values is determined by combining the first and second sets of attribute values, as described supra in Section 3. This section describes processing the third set of attribute values to identify users for advertising purposes (i.e., for directing advertising content pertaining to a product or service to such identified users).

In practice, an advertiser of a product or service may specify a set of target attributes and associated target attribute values, to serve as a reference against which to compare the attribute values in the third set of attribute values, so as to identify users whose attribute values are closest, or sufficiently close, to the target attribute values.

Figure 12:
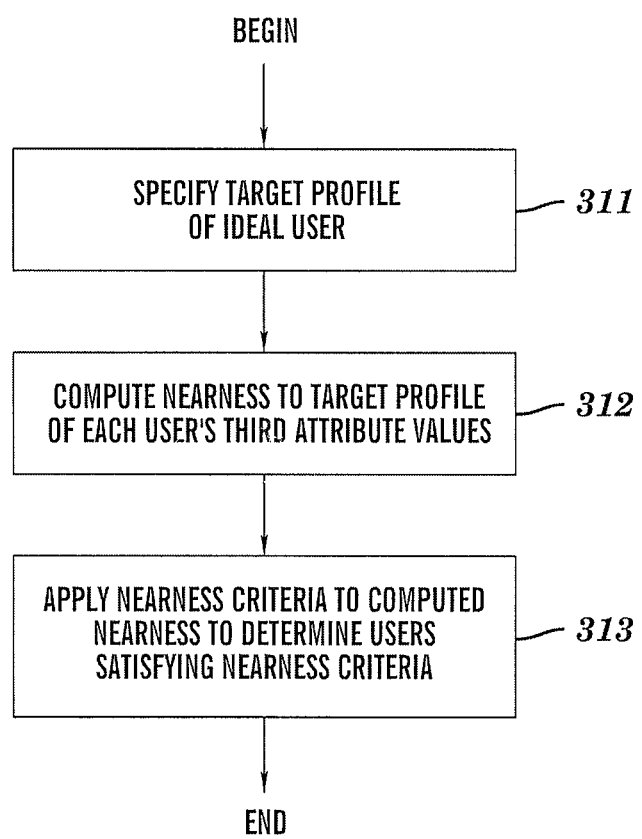
FIG. 12 is a flow chart describing a method for identifying users to whom advertising pertaining to a product or service may be directed, in accordance with embodiments of the present invention.

FIG. 12 is a flow chart describing a method for identifying users to whom advertising pertaining to a product or service may be directed, in accordance with embodiments of the present invention. The method of FIG. 12, which comprises steps 311-313, utilizes the third set of attribute values pertaining to a plurality of uses to determine a subset of the plurality of users to whom the advertising may be directed.

Step 311 specifies a target profile of an ideal user of the product or service. The target profile comprises at least two target attributes and associated target attribute values, wherein the plurality of attributes comprises the target attributes.

Step 312 computes for each user: a nearness to the target profile of each user's third attribute values as a function of the difference between each target attribute value and the corresponding third attribute value of each user.

Step 313 applies nearness criteria to the computed a nearness of each user's third attributes to the target profile to determine a subset of the plurality of users consisting of all users that satisfy the nearness criteria.

FIGS. 13-17 depict tables illustrating the method of FIG. 12, in accordance with embodiments of the present invention.

The table of FIG. 13 depicts 4 users ($U_1$, $U_2$, $U_3$, $U_4$) and a plurality of attributes consisting of 7 attributes ($a_1$, $a_2$, $a_3$, $a_4$, $a_5$, $a_6$, $a_7$). The 6 attributes of $a_1$, $a_2$, $a_3$, $a_4$, $a_5$, $a_6$ are the target attributes, and the associated target attribute values of "9" are shown in the "Target Profile" row to describe the target profile of an ideal user as specified in step 311. The $U_1$, $U_2$, $U_3$, $U_4$ rows indicate the third attribute values of the target attributes for each user. The third attribute values are derived from combining the first and second attribute values as described supra.

The table of FIG. 14 depicts, in the $U_1$, $U_2$, $U_3$, $U_4$ rows, the attribute value difference ($\Delta V$) between the target attribute values and the corresponding third attribute value, as computed in step 312 from the target attribute values and the third attribute values in the table of FIG. 13. FIGS. 14-17 illustrate various techniques of the present invention for implementing step 313 to apply nearness criteria to the computed nearness of each user's third attributes to the target profile to determine the users that satisfy the nearness criteria.

FIG. 14 further depicts a threshold difference (TD) for each target attribute against which the attribute value difference ($\Delta V$) may be compared. The TD row indicates a same threshold difference of 3 for each target attribute. The same or constant threshold difference may have any specified value (e.g., 0, 1, 2, 3, 4, etc.). However, the threshold difference may differ for different target attributes as illustrated in an alternative threshold difference (TD1) row in FIG. 14. The threshold difference TD1 is "1" for attributes $a_1$ and $a_6$, and is "2" for attributes $a_2$, $a_3$, $a_4$, and $a_5$.

In one embodiment, the nearness criteria for each user is that the difference ($\Delta V$) between each target attribute value and the corresponding third attribute value of each user does not exceed the specified threshold difference (TD or DT1) of each target attribute (i.e., $\Delta V \leq TD$ or TD1). If the TD row in FIG. 14 is used for the threshold differences, then the nearness criteria ($\Delta V \leq TD$ for every attribute) is satisfied for users $U_1$ and $U_4$, but is not satisfied for users $U_2$ and $U_3$. If the TD1 row in FIG. 14 is used for the threshold differences, then the nearness criteria ($\Delta V \leq TD1$ for every attribute) is satisfied for user $U_4$, but is not satisfied for users $U_1$, $U_2$ and $U_3$.

In one embodiment for each user, each third attribute whose third attribute value does not differ from the corresponding target attribute value by more than the threshold difference is determined to be a strong attribute. Accordingly, the table of FIG. 15 depicts "S" to denote those third attributes which are determined to be strong attributes with respect to the TD1 threshold differences (i.e., the third attribute is a strong attribute if $\Delta V \leq TD1$). For example, the attribute $a_3$ for user $U_2$ is a strong attribute, because the associated third attribute value ($\Delta V$) of 1 does not exceed the threshold difference (TD1) of 2.

In the preceding embodiment, a threshold ratio ($R_T$) is specified in conjunction with application of the nearness criteria. The nearness criteria for each user is that the ratio Ⓡ of the number of strongly matched attributes to the total number of target attributes is not less than the specified threshold ratio (i.e., $R \geq R_T$). Since the number of strong attributes is 4, 2, 3, 5 for users $U_1$, $U_2$, $U_3$, $U_4$, respectively, and the total number of target attributes 6, the ratio R is 0.67, 0.33, 0.50, 0.83 for users $U_1$, $U_2$, $U_3$, $U_4$, respectively. As an example if the specified threshold ratio $R_T$ is 0.60, then the nearness criteria is satisfied for users $U_1$ and $U_4$, but is not satisfied for users $U_2$ and $U_3$. As another example if the specified threshold ratio $R_T$ is 0.50, then the nearness criteria is satisfied for users $U_1$, $U_3$, and $U_4$, but is not satisfied for user $U_2$.

FIG. 16 depicts an example of one embodiment in which a first threshold difference (TD1) and a second threshold difference (TD2) are specified, such that TD2 exceeds TD1 for each threshold attribute. For each user, each third attribute whose third attribute value does not differ from the corresponding target attribute value by more than the first threshold difference is determined to be a strong attribute. For each user, each third attribute whose third attribute value does not differ from the corresponding target attribute value by more than the second threshold difference, but does differ from the corresponding target attribute value by more than the first threshold difference, is determined to be a medium attribute. For each user, each third attribute whose third attribute value differs from the corresponding target attribute value by more than the second threshold difference is determined to be a weak attribute. Accordingly, the table of FIG. 16 depicts "S" to denote a strong attribute, "M" to denote a medium attribute, and "W" to denote a weak attribute, using the preceding definitions of S, M, and W in conjunction with the values of TD1 and TD2 in FIG. 16.

For the preceding embodiment, the following parameters (in addition to TD1 and TD2) are specified: a threshold ratio ($R_T$); a strong weight ($W_S$); a medium weight ($W_M$); a weak weight ($W_W$); and a divisor (D) such that D exceeds the sum of $W_S$, $W_M$, and $W_W$. In other embodiments, it is required that D exceeds the sum of $W_S$, $W_M$, and $W_W$ by as specified amount A, wherein A is a positive real number (e.g., 0<A<1, A=1, 2, 3, 4, 5, 6, 7, 8, 9, 10, 15, 20, 25, 30, 40, 50, 75, 100, 200, etc.). Let $N_S$, $N_M$, and $N_W$ respectively denote the number of strong attributes, the number of medium attributes, and the number of weak attributes for each user. The nearness criteria for each user is that a ratio (R) is not less than the specified threshold ratio (i.e., $R \geq R_T$), wherein R=C/D, and wherein $C=W_S*N_S+W_M*N_M+W_W*N_W$.

As an example, assume that $W_S=10$, $W_M=5$, $W_W=2$, and D=30. Using FIG. 16 to determine $N_S$, $N_M$, and $N_W$ for each user, FIG. 17 indicates values for the following parameters for each user: $N_S$, $N_M$, and $N_W$; C; and R (for the case of D=30). For the indicated values of R in FIG. 17 and the specified threshold ratio ($R_T$), the nearness criteria can be applied for each user. As an example if $R_T=1.00$, then the nearness criteria is satisfied for users $U_1$, $U_2$, $U_3$, and $U_4$. As another example if $R_T=1.75$, then the nearness criteria is satisfied for user $U_4$, but is not satisfied for users $U_1$, $U_2$, and $U_3$.

In accordance with the present invention, the users not satisfying the nearness criteria are excluded from being comprised by the users to whom advertising of a product or service may be directed. Although the advertising of a product or service may be directed to the users satisfying the nearness criteria, some of the users satisfying the nearness criteria may also be excluded from the users to whom advertising of a product or service may directed by one or more constraints. For example, one or more constraints may limit the total number of users to which advertising of a product or service may be directed to a specified or determined maximum number ($N_{MAX}$) Of such users, either as specified or as calculated as a specified percentage of the plurality of users. Let $N_{SAT}$ denote the number of users satisfying the nearness criteria. Assuming that $N_{SAT}$ exceeds $N_{MAX}$, it is clear that $N_{EXCL}$ users of the $N_{SAT}$ users will be excluded from being comprised by the users to whom advertising of a product or service may be directed, wherein $N_{EXCL}=N_{SAT}-N_{MAX}$, such as by utilization of one of the following techniques:

(1) randomly selecting $N_{EXCL}$ users (of the $N_{SAT}$ users) to be excluded;

(2) randomly selecting $N_{MAX}$ users (of the $N_{SAT}$ users) to not be so excluded;

(3) excluding the $N_{EXCL}$ users (of the $N_{SAT}$ users) having the lowest ratios R as defined in any of the preceding embodiments that utilize R;

(4) not excluding the $N_{MAX}$ users (of the $N_{SAT}$ users) having the highest ratios R as defined in any of the preceding embodiments that utilize R.

5. Method for Determining Users to Whom Advertising May be Directed

Figure 18:
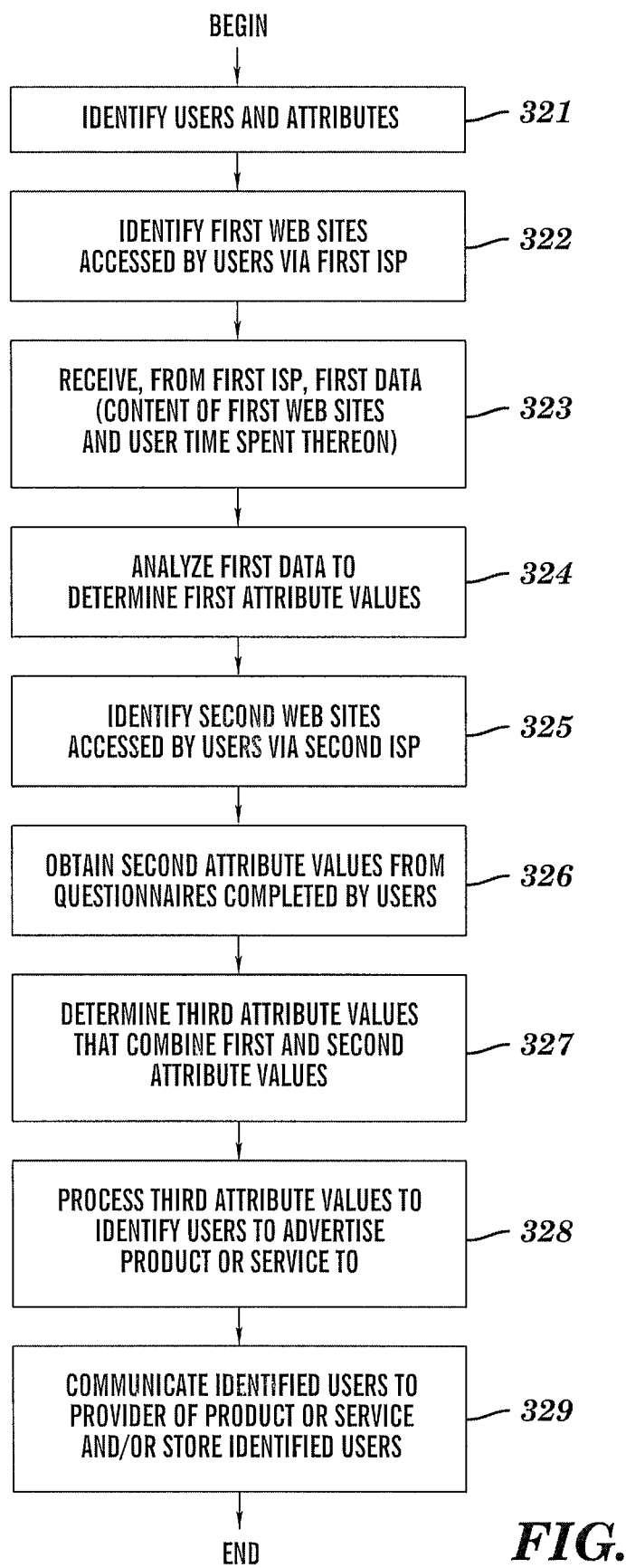
FIG. 18 is a flow chart of a method for identifying users for advertising purposes, in accordance with embodiments of the present invention.

FIG. 18 is a flow chart of method for identifying users for advertising purposes, in accordance with embodiments of the present invention. The flow chart of FIG. 18 integrates and encapsulates the methodology described supra in Sections 1-4. The method of FIG. 18 comprises steps 321-329.

Step 321 identifies a plurality of users and a plurality of attributes.

Step 322 identifies a first network of first web sites of the Internet accessed by the plurality of users, said access to the first web sites provided to the plurality of users by a first at least one Internet Service Provider (ISP).

Step 323 receives, from the first at least one ISP, first data comprising content of the first web sites and time data pertaining to when each user of the plurality of users accessed the first web sites.

Step 324 analyzes the first data to determine first attribute values comprising a first value of each attribute of the plurality of attributes for each user, said first value being indicative of a level of interest in each attribute by each user, said analyzing based on an amount of time spent by each user at each website of the first web sites in relation to the content of each website of the first web sites.

Step 325 identifies a second network of second web sites of the Internet accessed by the plurality users, said access to the second web sites provided to the plurality of users by a second at least one ISP.

Step 326 derives, from questionnaires completed by the plurality of users, second attribute values comprising a second value of each attribute of the plurality of attributes for each user, said second value being indicative of a level of interest in each attribute by each user, attribute values of said second attribute values having been indicated on the questionnaire by the users of the plurality of users for each attribute to which a keyword relevant to the second web sites has been mapped.

Step 327 determines third attribute values that comprise a third value of each attribute of the plurality of attributes for each user, by combining the first attribute values for each user with the second attribute values for each user.

Step 328 processes the third attribute values, said processing comprising determining from the third attribute values an identification of a subset of the plurality of users to whom advertising of a product or service may be directed; and Step 329 communicates the identification of the subset of the plurality of users to a provider of the product or service. Furthermore, the identification of the subset of the plurality of users may be stored in a computer usable storage medium of a computer system (see computer system 500 of FIG. 5 or computer system 99 of FIG. 6).

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for identifying users for advertising purposes, said method comprising:
   identifying a plurality of users and a plurality of attributes, each attribute being a subject, an activity, or a demographic characteristic;
   identifying a first network of first web sites of the Internet accessed by the plurality of users, said access to the first web sites provided to the plurality of users by a first at least one Internet Service Provider (ISP), wherein first user data pertaining to user participation of the plurality of users in the first web sites is obtainable from the first at least one ISP providing said access of the plurality of users to the first websites;

receiving, by a processor of a computer system from the first at least one ISP, the first user data comprising content of the first web sites and time data pertaining to when each user of the plurality of users accessed the first web sites;

said processor analyzing the first user data to determine first attribute values comprising a first value of each attribute of the plurality of attributes for each user, said first value being indicative of a level of interest in each attribute by each user, said analyzing based on an amount of time spent by each user at each website of the first web sites in relation to the content of each website of the first web sites;

identifying a second network of second web sites of the Internet accessed by the plurality users, said access to the second web sites provided to the plurality of users by a second at least one ISP;

said processor deriving a plurality of keywords from content of the second web sites that were accessed by the plurality of users;

after said deriving the plurality of keywords, said processor mapping the keywords of the plurality of keywords to the attributes of the plurality of attributes to determine a set of attributes, wherein each attribute of the set of attributes has been selected from the plurality of attributes by a keyword of the plurality of keywords that has been mapped to each attribute via said mapping, and wherein the plurality of attributes consists of the set of attributes and at least one attribute of the plurality of attributes to which no keyword of the plurality of keywords has been mapped via said mapping;

said processor receiving, from questionnaires completed by the plurality of users, a second value of each attribute of the set of attributes for each user, said questionnaires comprising the set of attributes determined from said mapping the keywords from content of the second web sites to the attributes of the plurality of attributes, wherein second user data pertaining to user participation of the plurality of users in the second web sites is not obtainable from the second at least one ISP providing access of the plurality of users to the second websites;

said processor assigning for each user a second value to each attribute of the at least one attribute to which no keyword of the plurality of keywords has been mapped via said mapping, said assigned second value consisting of a minimum attribute value of a range of attribute values, wherein a second attribute value for each attribute of the plurality of attributes for each user consists of the second value of each attribute of the set of attributes for each user and the second value of each attribute of the at least one attribute for each user;

said processor determining third attribute values that comprise a third value of each attribute of the plurality of attributes for each user, by combining the first attribute values for each user with the second attribute values for each user;

said processor processing the third attribute values, said processing comprising determining from the third attribute values an identification of a subset of the plurality of users to whom advertising of a product or service may be directed by:

specifying a target profile of an ideal user of the product or service, said target profile comprising at least two target attributes and associated target attribute values, said plurality of attributes comprising the target attributes;

for each user, computing a nearness to the target profile of each user's third attribute values as a function of a difference between each target attribute value and the corresponding third attribute value of each user; and applying nearness criteria to the computed nearness of each user's third attributes to the target profile to determine the subset of the plurality of users consisting of all users that satisfy the nearness criteria; and communicating the identification of the subset of the plurality of users to a provider of the product or service for tailoring advertising content pertaining to the product or service via utilization of user profiles of the subset of the plurality of users, said advertising content being directed to the subset of the plurality of users by the provider of the product or service.

2. The method of claim 1, wherein the second at least one ISP does not have access to the at least one attribute of the plurality of attributes to which no keyword of the plurality of keywords has been mapped via said mapping.

3. The method of claim 1, wherein the plurality of users consist of N users such that N is at least 2;

wherein the plurality of attributes consist of M attributes such that M is at least 2;

wherein $V_{nm,1}$ and $V_{nm,2}$ and $V_{nm,3}$ respectively denote the attribute value for attribute m of user n for the first, second, and third attribute values, for n=1, 2, ... N and m=1, 2, ..., M;

wherein for a function $F(V_{nm,k})$ of $V_{nm,k}$ for n=1, 2, ... N and m=1, 2, ..., M and k=1, 2, said determining third attribute values comprises computing $V_{nm,3}$ according to:

$V_{nm,3} = W_{m,1} * F(V_{nm,1}) + W_{m,2} * F(V_{nm,2})$;

wherein $W_{m,k}$ is a weight that acts as a multiplier on $F(V_{nm,2})$ for k=1, 2.

4. The method of claim 3, wherein $W_{m,k}$ varies with both m and k.

5. The method of claim 3, wherein $W_{m,k}$ varies with m but does not vary with k.

6. The method of claim 3, wherein $W_{m,k}$ does not vary with m but does vary with k.

7. The method of claim 3, wherein $F(V_{nm,k})$ is a linear function of $V_{nm,k}$.

8. The method of claim 3, wherein $F(V_{nm,k})$ is a nonlinear function of $V_{nm,k}$.

9. The method of claim 1, wherein the method further comprises specifying a threshold difference for each target attribute, and wherein the nearness criteria for each user is that the difference between each target attribute value and the corresponding third attribute value of each user does not exceed the specified threshold difference of each target attribute.

10. The method of claim 1, wherein the method further comprises:

for each user, determining each third attribute whose third attribute value does not differ from the corresponding target attribute value by more than the threshold difference to be a strong attribute; and specifying a threshold difference (TD) for each target attribute and a threshold ratio ($R_T$), wherein the nearness criteria for each user comprises a first criterion that the ratio (R) of the number of strong attributes to the total number of target attributes is not less than the specified threshold ratio ($R_T$).

11. The method of claim 1, wherein the method further comprises:
specifying a first threshold difference (TD1) for each target attribute;
specifying a second threshold difference (TD2) for each target attribute, said second threshold difference (TD2) exceeding the first threshold difference (TD1);
specifying a threshold ratio ($R_T$);
specifying a strong weight ($W_S$), a medium weight ($W_M$), a weak weight ($W_W$), and a divisor (D) that exceeds the sum of the first weight, the second weight, and the third weight;
for each user, determining each third attribute whose third attribute value does not differ from the corresponding target attribute value by more than the first threshold difference (TD1) to be a strong attribute;
for each user, determining each third attribute whose third attribute value does not differ from the corresponding target attribute value by more than the second threshold difference (TD2), but does differ from the corresponding target attribute value by more than the first threshold difference (TD1), to be a medium attribute;
for each user, determining each third attribute whose third attribute value differs from the corresponding target attribute value by more than the second threshold difference (TD2) to be a weak attribute,
wherein the nearness criteria for each user comprises a first criterion that a ratio ® of a sum (C) of a first product, a second product, and a third product to the divisor (D) is not less than the specified threshold ratio ($R_T$),
wherein the first product for each user is a product of the strong weight ($W_S$) and the number of strong attributes ($N_S$),
wherein the second product for each user is a product of the medium weight ($W_M$) and the number of medium attributes ($N_M$), and
wherein the third product for each user is a product of the weak weight ($W_W$) and the number of weak attributes ($N_W$).

12. The method of claim 1, wherein the nearness criteria is subject to a constraint that limits the total number of users to which advertising of a product or service may be directed to a specified or determined maximum number of such users.

13. A computer system comprising a processor and a computer readable memory unit coupled to the processor, said memory unit containing instructions that when executed by the processor perform a method for identifying users for advertising purposes, said method comprising:
identifying a plurality of users and a plurality of attributes, each attribute being a subject, an activity, or a demographic characteristic;
identifying a first network of first web sites of the Internet accessed by the plurality of users, said access to the first web sites provided to the plurality of users by a first at least one Internet Service Provider (ISP), wherein first user data pertaining to user participation of the plurality of users in the first web sites is obtainable from the first at least one ISP providing said access of the plurality of users to the first websites;
receiving, from the first at least one ISP, the first user data comprising content of the first web sites and time data pertaining to when each user of the plurality of users accessed the first web sites;
analyzing the first user data to determine first attribute values comprising a first value of each attribute of the plurality of attributes for each user, said first value being indicative of a level of interest in each attribute by each user, said analyzing based on an amount of time spent by each user at each website of the first web sites in relation to the content of each website of the first web sites;
identifying a second network of second web sites of the Internet accessed by the plurality users, said access to the second web sites provided to the plurality of users by a second at least one ISP;
deriving a plurality of keywords from content of the second web sites that were accessed by the plurality of users;
after said deriving the plurality of keywords, said processor mapping the keywords of the plurality of keywords to the attributes of the plurality of attributes to determine a set of attributes, wherein each attribute of the set of attributes has been selected from the plurality of attributes by a keyword of the plurality of keywords that has been mapped to each attribute via said mapping, and wherein the plurality of attributes consists of the set of attributes and at least one attribute of the plurality of attributes to which no keyword of the plurality of keywords has been mapped via said mapping;
receiving, from questionnaires completed by the plurality of users, a second value of each attribute of the set of attributes for each user, said questionnaires comprising the set of attributes determined from said mapping the keywords from content of the second web sites to the attributes of the plurality of attributes, wherein second user data pertaining to user participation of the plurality of users in the second web sites is not obtainable from the second at least one ISP providing access of the plurality of users to the second websites;
assigning for each user a second value to each attribute of the at least one attribute to which no keyword of the plurality of keywords has been mapped via said mapping, said assigned second value consisting of a minimum attribute value of a range of attribute values, wherein a second attribute value for each attribute of the plurality of attributes for each user consists of the second value of each attribute of the set of attributes for each user and the second value of each attribute of the at least one attribute for each user;
determining third attribute values that comprise a third value of each attribute of the plurality of attributes for each user, by combining the first attribute values for each user with the second attribute values for each user;
processing the third attribute values, said processing comprising determining from the third attribute values an identification of a subset of the plurality of users to whom advertising of a product or service may be directed by:
specifying a target profile of an ideal user of the product or service, said target profile comprising at least two target attributes and associated target attribute values, said plurality of attributes comprising the target attributes;
for each user, computing a nearness to the target profile of each user's third attribute values as a function of a difference between each target attribute value and
the corresponding third attribute value of each user;
and applying nearness criteria to the computed nearness of
each user's third attributes to the target profile to
determine the subset of the plurality of users consisting of all users that satisfy the nearness criteria;
and communicating the identification of the subset of the
plurality of users to a provider of the product or service
for tailoring advertising content pertaining to the product or service via utilization of user profiles of the
subset of the plurality of users, said advertising content
being directed to the subset of the plurality of users by
the provider of the product or service.

14. A computer program product, comprising a computer readable hardware storage device having a computer readable program code stored therein, said computer readable program code containing instructions that when executed by a processor of a computer system perform a method for identifying users for advertising purposes, said method comprising:

identifying a plurality of users and a plurality of attributes, each attribute being a subject, an activity, or a demographic characteristic;

identifying a first network of first web sites of the Internet accessed by the plurality of users, said access to the first web sites provided to the plurality of users by a first at least one Internet Service Provider (ISP), wherein first user data pertaining to user participation of the plurality of users in the first web sites is obtainable from the first at least one ISP providing said access of the plurality of users to the first websites;

receiving, from the first at least one ISP, the first user data comprising content of the first web sites and time data pertaining to when each user of the plurality of users accessed the first web sites;

analyzing the first user data to determine first attribute values comprising a first value of each attribute of the plurality of attributes for each user, said first value being indicative of a level of interest in each attribute by each user, said analyzing based on an amount of time spent by each user at each website of the first web sites in relation to the content of each website of the first web sites;

identifying a second network of second web sites of the Internet accessed by the plurality users, said access to the second web sites provided to the plurality of users by a second at least one ISP;

deriving a plurality of keywords from content of the second web sites that were accessed by the plurality of users;

after said deriving the plurality of keywords, said processor mapping the keywords of the plurality of keywords to the attributes of the plurality of attributes to determine a set of attributes, wherein each attribute of the set of attributes has been selected from the plurality of attributes by a keyword of the plurality of keywords that has been mapped to each attribute via said mapping, and wherein the plurality of attributes consists of the set of attributes and at least one attribute of the plurality of attributes to which no keyword of the plurality of keywords has been mapped via said mapping;

receiving, from questionnaires completed by the plurality of users, a second value of each attribute of the set of attributes for each user, said questionnaires comprising the set of attributes determined from said first user data first user data mapping the keywords from content of the second web sites to the attributes of the plurality of attributes, wherein second user data pertaining to user participation of the plurality of users in the second web sites is not obtainable from the second at least one ISP providing access of the plurality of users to the second websites;

assigning for each user a second value to each attribute of the at least one attribute to which no keyword of the plurality of keywords has been mapped via said mapping, said assigned second value consisting of a minimum attribute value of a range of attribute values, wherein a second attribute value for each attribute of the plurality of attributes for each user consists of the second value of each attribute of the set of attributes for each user and the second value of each attribute of the at least one attribute for each user;

determining third attribute values that comprise a third value of each attribute of the plurality of attributes for each user, by combining the first attribute values for each user with the second attribute values for each user;

processing the third attribute values, said processing comprising determining from the third attribute values an identification of a subset of the plurality of users to whom advertising of a product or service may be directed by:

specifying a target profile of an ideal user of the product or service, said target profile comprising at least two target attributes and associated target attribute values, said plurality of attributes comprising the target attributes;

for each user, computing a nearness to the target profile of each user's third attribute values as a function of a difference between each target attribute value and the corresponding third attribute value of each user; and applying nearness criteria to the computed nearness of each user's third attributes to the target profile to determine the subset of the plurality of users consisting of all users that satisfy the nearness criteria; and communicating the identification of the subset of the plurality of users to a provider of the product or service for tailoring advertising content pertaining to the product or service via utilization of user profiles of the subset of the plurality of users, said advertising content being directed to the subset of the plurality of users by the provider of the product or service.

15. A process for supporting computer infrastructure, said process comprising providing at least one support service for at least one of creating, integrating, hosting, maintaining, and deploying computer-readable code in a computer system, wherein the code in combination with the computer system is configured to perform a method for identifying users for advertising purposes, said method comprising:

identifying a plurality of users and a plurality of attributes, each attribute being a subject, an activity, or a demographic characteristic;

identifying a first network of first web sites of the Internet accessed by the plurality of users, said access to the first web sites provided to the plurality of users by a first at least one Internet Service Provider (ISP), wherein first user data pertaining to user participation of the plurality of users in the first web sites is obtainable from the first at least one ISP providing said access of the plurality of users to the first websites;

receiving, by a processor of the computer system from the first at least one ISP, the first user data comprising content of the first web sites and time data pertaining to when each user of the plurality of users accessed the first web sites;

said processor analyzing the first user data to determine first attribute values comprising a first value of each attribute of the plurality of attributes for each user, said first value being indicative of a level of interest in each attribute by each user, said analyzing based on an amount of time spent by each user at each website of the first web sites in relation to the content of each website of the first web sites;

identifying a second network of second web sites of the Internet accessed by the plurality users, said access to the second web sites provided to the plurality of users by a second at least one ISP;

said processor deriving a plurality of keywords from content of the second web sites that were accessed by the plurality of users;

after said deriving the plurality of keywords, said processor mapping the keywords of the plurality of keywords to the attributes of the plurality of attributes to determine a set of attributes, wherein each attribute of the set of attributes has been selected from the plurality of attributes by a keyword of the plurality of keywords that has been mapped to each attribute via said mapping, and wherein the plurality of attributes consists of the set of attributes and at least one attribute of the plurality of attributes to which no keyword of the plurality of keywords has been mapped via said mapping;

said processor receiving, from questionnaires completed by the plurality of users, a second value of each attribute of the set of attributes for each user, said questionnaires comprising the set of attributes determined from said mapping the keywords from content of the second web sites to the attributes of the plurality of attributes, wherein second user data pertaining to user participation of the plurality of users in the second web sites is not obtainable from the second at least one ISP providing access of the plurality of users to the second websites;

said processor assigning for each user a second value to each attribute of the at least one attribute to which no keyword of the plurality of keywords has been mapped via said mapping, said assigned second value consisting of a minimum attribute value of a range of attribute values, wherein a second attribute value for each attribute of the plurality of attributes for each user consists of the second value of each attribute of the set of attributes for each user and the second value of each attribute of the at least one attribute for each user;

said processor determining third attribute values that comprise a third value of each attribute of the plurality of attributes for each user, by combining the first attribute values for each user with the second attribute values for each user;

said processor processing the third attribute values, said processing comprising determining from the third attribute values an identification of a subset of the plurality of users to whom advertising of a product or service may be directed by:

specifying a target profile of an ideal user of the product or service, said target profile comprising at least two target attributes and associated target attribute values, said plurality of attributes comprising the target attributes;

for each user, computing a nearness to the target profile of each user's third attribute values as a function of a difference between each target attribute value and the corresponding third attribute value of each user; and applying nearness criteria to the computed nearness of each user's third attributes to the target profile to determine the subset of the plurality of users consisting of all users that satisfy the nearness criteria; and communicating the identification of the subset of the plurality of users to a provider of the product or service for tailoring advertising content pertaining to the product or service via utilization of user profiles of the subset of the plurality of users, said advertising content being directed to the subset of the plurality of users by the provider of the product or service.

\* \* \* \* \*